United States Patent [19]

Roberts

[11] Patent Number: 4,808,868
[45] Date of Patent: Feb. 28, 1989

[54] SINGLE AND POLYPHASE ELECTROMAGNETIC INDUCTION MACHINES HAVING REGULATED POLAR MAGNETIC SYMMETRY

[75] Inventor: Gary D. Roberts, Lindon, Utah
[73] Assignee: S.P.C. Holding Co., Inc., Salt Lake City, Utah
[21] Appl. No.: 83,137
[22] Filed: Aug. 12, 1987

Related U.S. Application Data

[63] Continuation-in-part of Ser. No. 900,700, Aug. 27, 1986.

[51] Int. Cl.$^4$ .................. H02K 11/00; H02P 1/44
[52] U.S. Cl. .................. 310/68 R; 310/184; 318/795; 318/817
[58] Field of Search .................. 310/68 R, 68 E, 72, 310/180, 184; 318/749, 794, 795, 816, 817

[56] References Cited

U.S. PATENT DOCUMENTS

| | | |
|---|---|---|
| 1,050,444 | 1/1913 | Fynn . |
| 1,074,125 | 9/1913 | Lamme . |
| 1,707,424 | 4/1929 | Bailey . |
| 2,648,808 | 8/1953 | Tiede . |
| 3,526,816 | 9/1970 | Paice et al. . |
| 3,555,382 | 1/1971 | Miyasaka et al. . |
| 3,716,734 | 2/1973 | Fam . |
| 4,020,647 | 5/1977 | Shirn . |
| 4,063,135 | 12/1977 | Wanlass . |
| 4,095,149 | 6/1978 | Wanlass . |
| 4,132,932 | 1/1979 | Wanlass . |
| 4,152,630 | 5/1979 | Wanlass .................. 318/796 |
| 4,187,457 | 2/1980 | Wanlass .................. 318/729 |
| 4,189,654 | 2/1980 | Mourier . |
| 4,221,983 | 9/1980 | Mourier . |
| 4,338,557 | 7/1982 | Wanlass . |
| 4,446,416 | 5/1984 | Wanlass . |
| 4,464,618 | 8/1984 | Shoemaker .................. 318/794 |
| 4,642,545 | 2/1987 | Lewus .................. 318/795 |
| 4,675,565 | 6/1987 | Lewus .................. 310/68 R |

FOREIGN PATENT DOCUMENTS

| | | |
|---|---|---|
| 586131 | 11/1959 | Canada . |
| 282276 | 2/1915 | Fed. Rep. of Germany . |
| 729008 | 3/1931 | France . |
| 2001736 | 10/1969 | France . |
| 2218678 | 9/1974 | France . |
| 2369726 | 5/1978 | France . |
| 53-93316 | 8/1978 | Japan . |

OTHER PUBLICATIONS

Introduction to Electric Circuits, Herbert W. Jackson, 6th Ed., p. 636.

Primary Examiner—Patrick R. Salce
Assistant Examiner—D. L. Rebsch
Attorney, Agent, or Firm—Mason, Fenwick & Lawrence

[57] ABSTRACT

An induction motor includes a stator having at least one pair of stator windings and a rotor with rotor windings which are magnetically coupled to the stator windings via a circumferential air gap. The rotor windings are connected together in a squirrel cage or a wound rotor configuration. The stator windings are connected in series across the source. A capacitor is connected in parallel with one of the stator windings and this combination is connected in series with the other stator winding and is sized to form a quasi-double-resonant circuit, i.e., a quasi-parallel resonant circuit with the one winding and a quasi-series resonant circuit with the other winding. The stator windings are then grouped to form definite polar areas in the stator and a balanced rotating magnetic field is produced by all the windings throughout the entire load range when the motor is connected to a power source. Both a single-phase and a polyphase motor can be configured as a quasi-double-resonant circuit with respect to each input power phase. A further polyphase motor is also described with primary stator windings connected to each power phase input and interleaved secondary stator winding magnetically coupled to the primary stator windings but not directly connected to the power inputs. The secondary stator windings have capacitors coupled in parallel thereto to form parallel floating resonant circuits. In all of these motors, the power factor is in the range of 0.96 to 1.00, but normally closer to unity due to the resonant behavior of the circuitry. The induction motor can be driven above synchronous speed to act as a generator. Also, a method of generating torque is described.

38 Claims, 9 Drawing Sheets

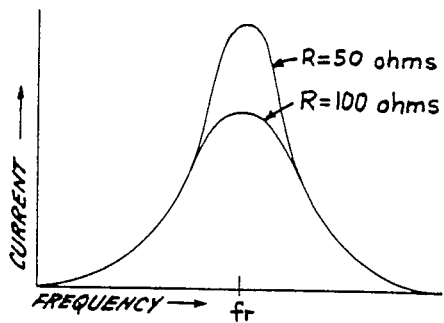
FIG-7A
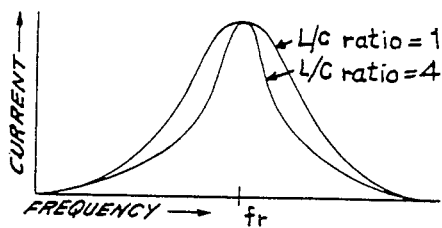
FIG-7B
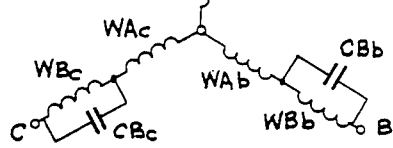
FIG-10
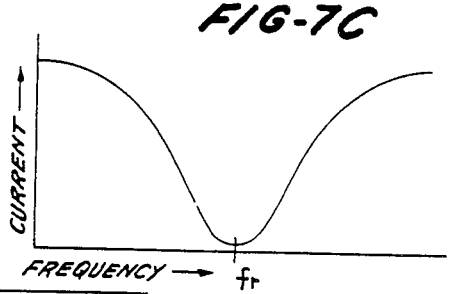
FIG-7C
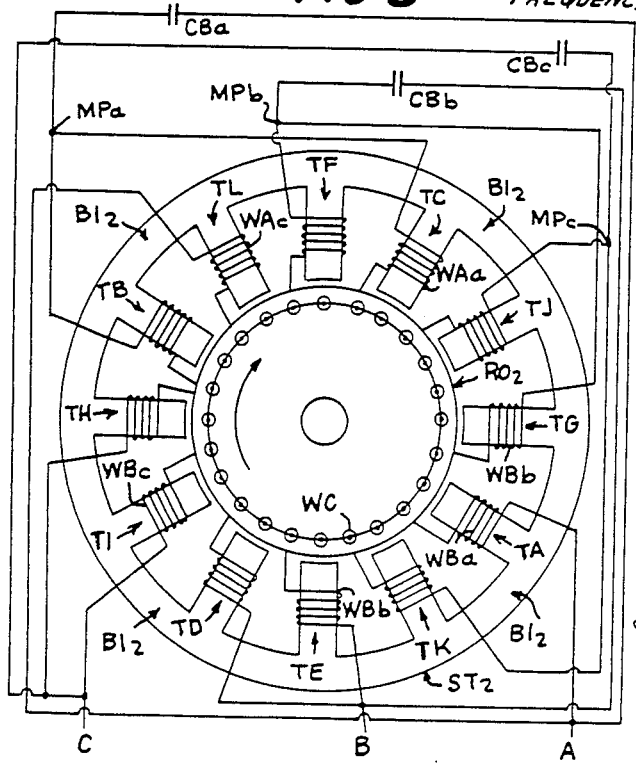
FIG-8
FIG-9

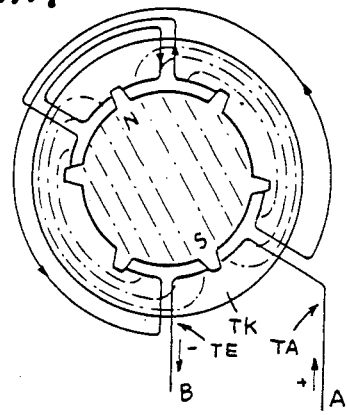
FIG-11A 0 DEGREES
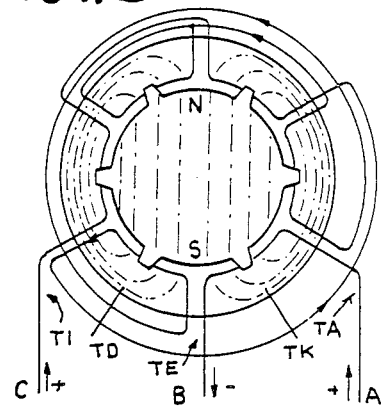
FIG-11B 30 DEGREES
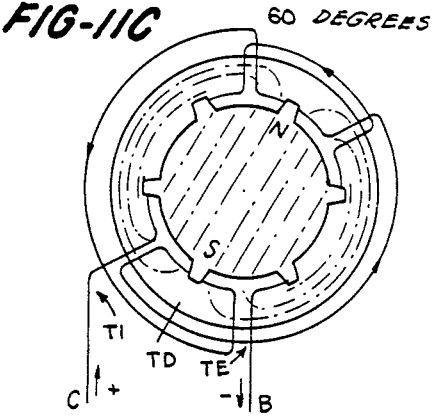
FIG-11C 60 DEGREES
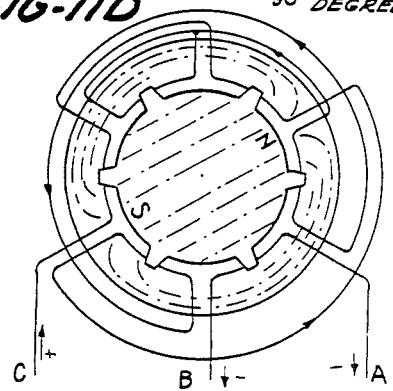
FIG-11D 90 DEGREES
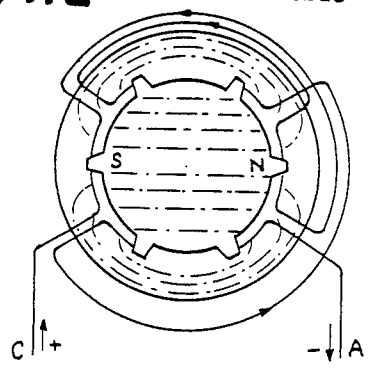
FIG-11E 120 DEGREES
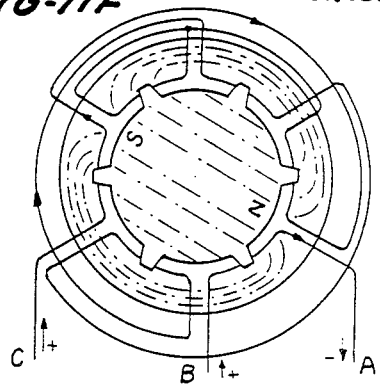
FIG-11F 150 DEGREES

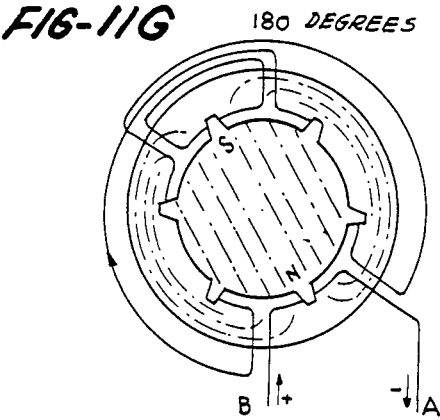
FIG-11G  180 DEGREES
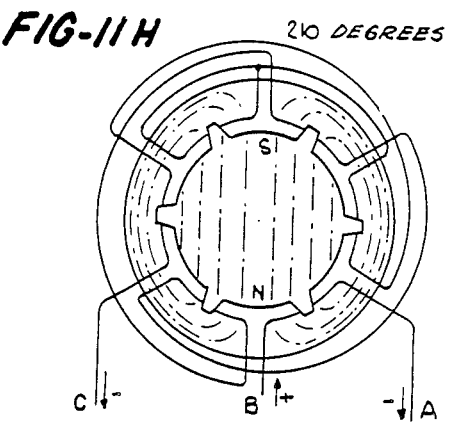
FIG-11H  210 DEGREES
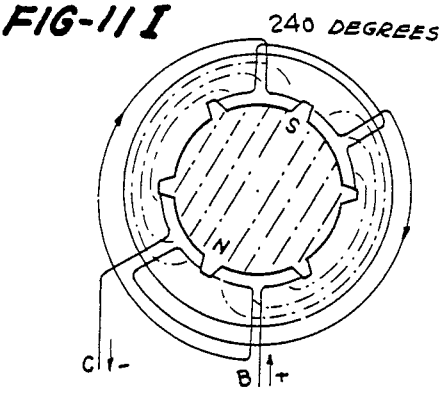
FIG-11I  240 DEGREES
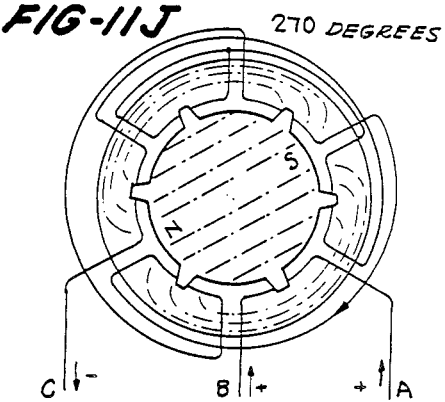
FIG-11J  270 DEGREES
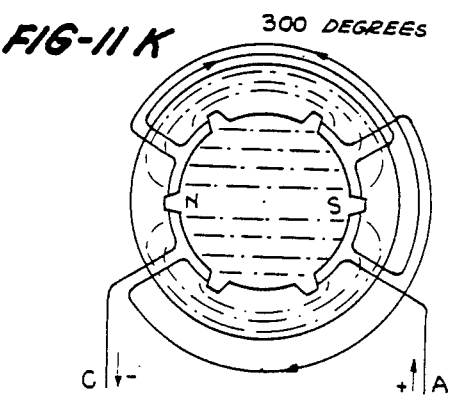
FIG-11K  300 DEGREES
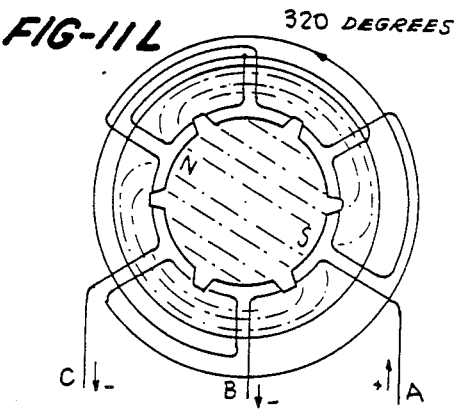
FIG-11L  320 DEGREES

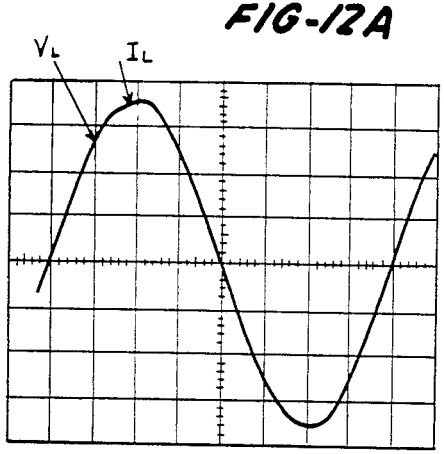
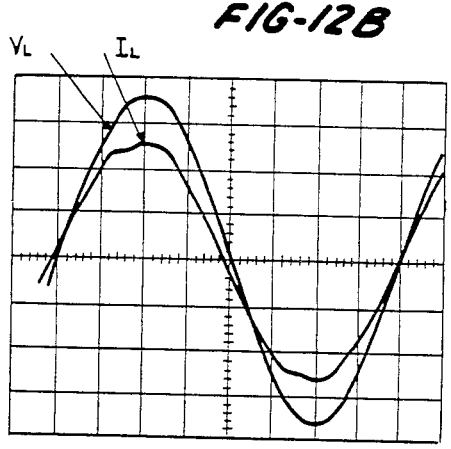
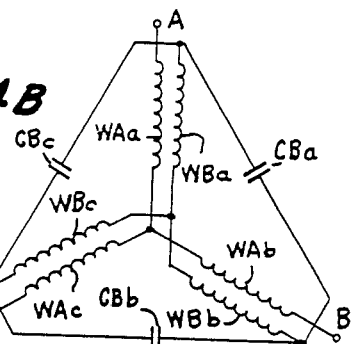
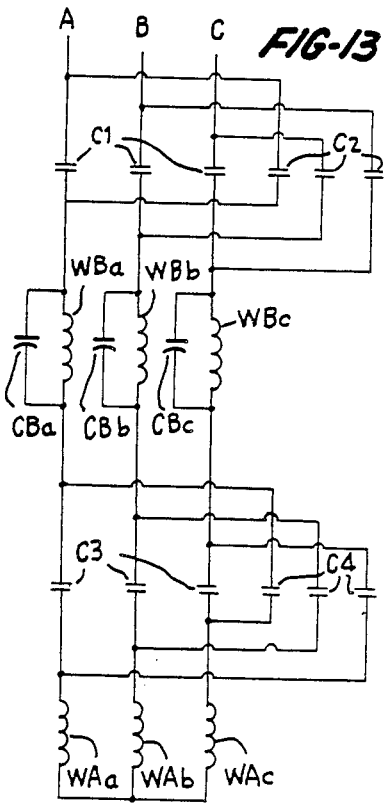
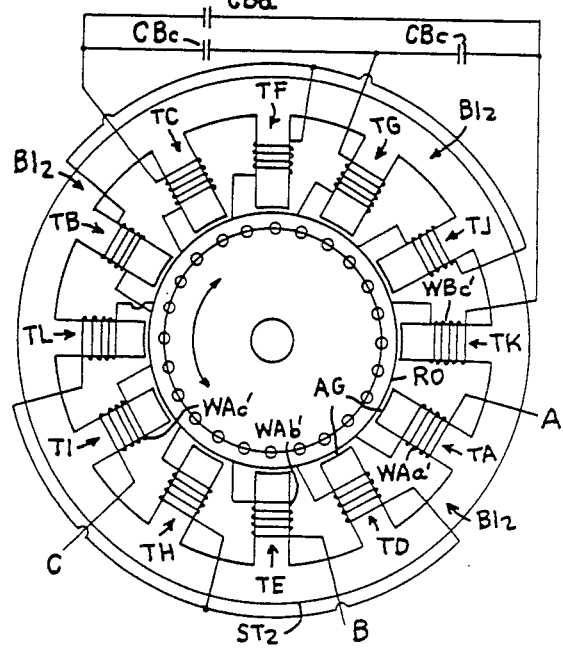

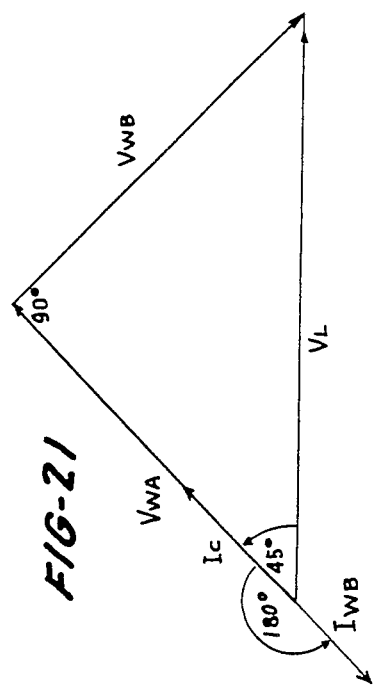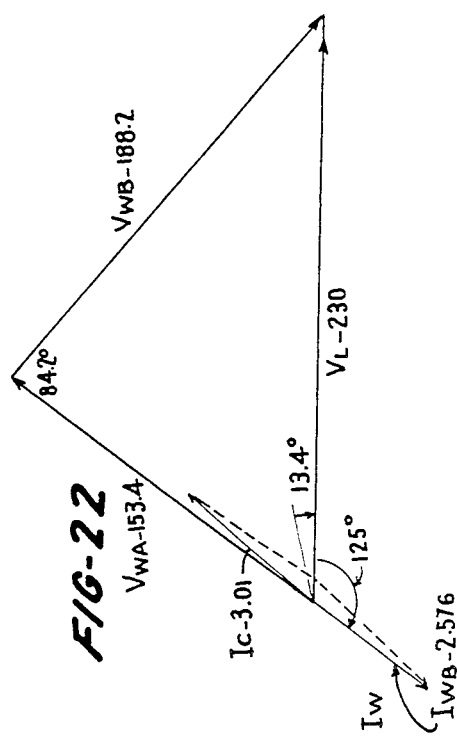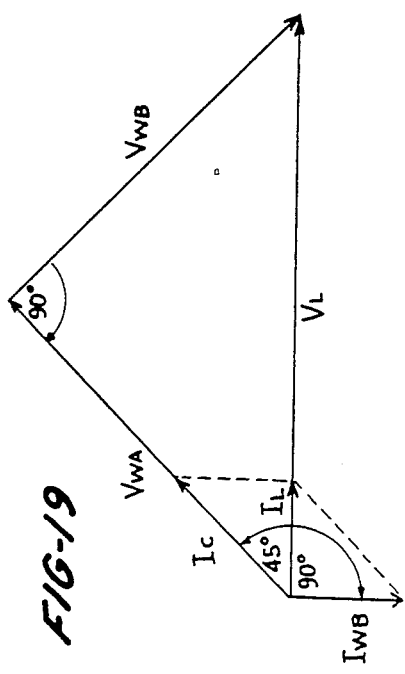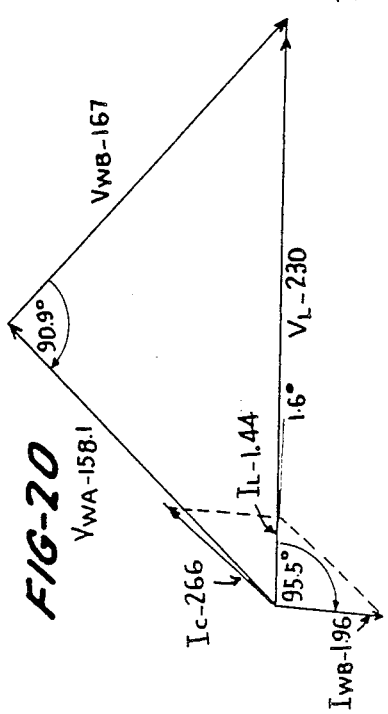

CONSTANT AMPLITUDE REVOLVING MAGNETIC FIELD PRODUCED BY QUASI-DOUBLE-RESONANT MOTOR

SINGLE AND POLYPHASE ELECTROMAGNETIC INDUCTION MACHINES HAVING REGULATED POLAR MAGNETIC SYMMETRY

This application is a continuation-in-part of application Ser. No. 900,700, filed Aug. 27, 1986.

FIELD OF THE INVENTION

The present invention relates to single and polyphase electromagnetic induction machines having regulated polar magnetic symmetry.

BACKGROUND OF THE INVENTION

With the advent of higher utility rates, power factor penalties and demand charges, prior art induction motors have many disadvantages. Most induction motors in use are over-sized and inefficient. Consequently power bills are higher than need be due to motor inefficiency, high demand and poor power factor (KW/KVA). As is known, the power factor involves the phase relationship between the a.c. voltage and the a.c. current. Utility companies generally charge a premium to the user when the power factor falls below 0.85 (a power factor of unity is present when the voltage and current are of the same waveform completely in phase).

When energy rates were low, these drawbacks were not as important as they now are. Often demand (the total electrical power that needs to be available, but not necessarily used from the line) and power factor penalties are as much or more than the basic energy charge.

The most efficient prior art, single-phase induction motors are of the permanent-split capacitor design, but they have low torque characteristics and are efficient only when the magnetic field of the direct phase winding is balanced with that of the auxiliary phase winding and their respective currents are displaced by 90°. In most split capacitor motors, a large stator winding is directly connected to the power terminals and a smaller auxiliary winding, serially connected to a capacitor, is also connected across the input. The 90° displacement of current between both stator windings only exists at design load; at other load points a disproportionate distribution of magnetic flux exists which sets up negative sequence currents in the rotor and stator, space harmonics in the air gap (e.g., the degree to which the flux distribution in the air gap is not sinusoidal) and high leakage reactance from the stator end turns. For example, an imbalance of phase voltages on the order of 3% can cause a 15% to 20% increase in motor losses.

This condition is not restricted to single-phase motors but is also prevalent in polyphase motors when an imbalance occurs in the polyphase voltage supply. These losses in both single and polyphase motors can degrade insulation and reduce bearing life due to overheating of the rotor and, in addition to overheating, an imbalance creates higher magnetostriction noise and poor operating performance, as can be seen in Table 1.

Another significant disadvantage is in the manufacture of new motors. Engineers are now focusing on design tolerances in an attempt to increase motor efficiencies, producing a motor which is more susceptible to failure due to environmental changes and bearing wear. Attempts have been made to create a balanced condition by a series resonating winding in combination with a phase winding but this is a tuned condition for a narrow spectrum only, and at certain load points circulating harmonic currents increase, and the efficiency is reduced to below that of the standard design.

Induction motors and generators are efficient only when properly sized to the load and when the line voltage is balanced. When operated below design load or with a system imbalance, a disproportionate polar magnetic condition exists which sets up negative sequence currents in the rotor and stator, space harmonics in the air gap and high leakage reactance due to high currents in the phase winding. Again, an imbalance in the order of 3% can cause a 15% to 20% increase in motor or generator losses. This reduces insulation and bearing life and creates an imbalance which is manifested as higher magnetostriction noise and poor operating performance. Attempts have also been made to create a balanced and controlled condition in the motor by a series resonating winding in combination with a phase winding but this is a tuned condition for a narrow spectrum and at certain load points circulating harmonic currents increase and the efficiency is reduced to below that of the standard design.

SUMMARY OF THE INVENTION

The single-phase, dynamoelectric machine, which can be a motor or a generator, includes a rotatable rotor usually in the interior space defined by a hollow cylindrical stationary stator. Both the rotor and stator have slots therein facing each other within which are disposed windings. The rotor windings may be connected at each end to form a squirrel cage or brought out via slip rings. In the stator, two windings are electrically connected in series and are circumferentially placed around the interior surface of the hollow stator core to form magnetic poles. A capacitor is coupled in parallel with one winding and this combination is connected in series with the second winding. The size of the capacitor is such that a quasi-series resonant circuit is formed with the second winding and a quasi-parallel resonant circuit is formed with the first winding. The serially connected stator windings are connected across the single-phase or polyphase power input terminals.

When power is applied to the motor, a balanced rotating magnetic field is generated wherein the Q factor of the circuit is continually adjusted by the admittance of the rotor windings. Because of the interaction between the quasi-series resonant circuit and the quasi-parallel resonant circuit, unused energy delivered to the rotor in the form of magnetic flux is returned via one of the stator windings and, upon collapse of the magnetic field, the resulting voltage is stored in the capacitor. This is due to, for example, a reduction in load torque on the rotor. In another sense, when the torque requirements on the rotor are higher, the capacitor delivers stored energy to the appropriate winding to compensate for the additional power requirements and maintain a balanced distribution of magnetic flux circumferentially rotating around the rotor.

The method of generating torque from an a.c. power source includes the step of forming a quasi-double-resonant circuit, including a capacitive element which is connected in parallel to one of the inductive elements and this combination connected in series with the other inductive element, providing a rotatable inductive element adapted to deliver torque; applying power across the two serially connected, stationary inductive elements, magnetically coupling all the inductive elements and producing a balanced rotating magnetic flux wave via the mechanism described above with respect to the quasi-serial and quasi-parallel resonant circuits.

In one embodiment, the polyphase induction motor includes three pairs of serially connected stator windings wherein a capacitor is coupled in parallel to one of the windings in each pair and the combination coupled in series with other winding in the pair to form a quasi-double-resonant circuit. A further embodiment of the polyphase motor includes three primary stator windings which receive, via one of the power input terminals, a different phase of the three-phase power applied to the motor. Three secondary stator windings are circumferentially interleaved in the stator between the three primary stator windings and are magnetically coupled to the primary windings but are not directly connected to the power input terminals of the motor. A capacitor is provided for each pair of secondary stator windings and the respective capacitor is in parallel with at least one secondary stator winding. Each capacitor is sized to form a quasi-parallel floating resonant circuit with the parallel connected secondary stator winding.

Thus, it is a primary object of the present invention to eliminate or control space harmonics in the air gap, negative sequence currents in the rotor and stator windings and increase the efficiency of an induction motor or generator.

It is another object of the present invention to increase the torque rating of a motor without increasing hysteresis loss due to magnetic saturation.

It is a further object of the present invention to improve the power factor of an induction motor.

It is an additional object of the present invention to store unused energy returned to the stator windings and deliver stored energy to the magnetic circuit upon demand.

It is still another object of the present invention to produce a balanced rotating magnetic flux wave around the rotor at substantially all loads.

The subject matter which is regarded as the invention together with further objects and advantages thereof may best be understood by reference to the following description taken in conjunction with the accompanying drawings.

BRIEF DESCRIPTION OF THE DRAWINGS

FIG. 7A shows the effect of resistance on the shape of a series resonance curve.

FIG. 7B shows the effect of L/C ratio on the shape of a series resonance curve.

FIG. 7C shows the parallel resonance curve.

FIG. 8 is a diagrammatical representation of a polyphase induction motor with regulated polar magnetic symmetry including a quasi-double-resonant equalizer circuit.

FIG. 9 is an electrical schematic diagram of the polyphase, quasi-double-resonant induction motor of FIG. 8 wherein the stator resonant windings are connected in a Δ configuration with respect to the source.

FIG. 10 is an electrical schematic diagram of the polyphase, quasi-double-resonant induction motor of FIG. 8 wherein the stator resonant windings are connected in wye configuration with respect to the source.

FIGS. 11A through 11L are diagrams showing the electric current and magnetic conditions in a two-pole, three-phase induction motor for each 30° of a complete cycle.

FIG. 12A is an oscilloscope trace of the line supply voltage $V_L$ and the line current $I_L$ of one phase at full load in a 40 horsepower, three-phase, quasi-double-resonant induction motor.

FIG. 12B is an oscilloscope trace of the line supply voltage and the line current of one phase at 75% load for the motor of FIG. 12A.

FIG. 13 is a switching network for changing rotation of the double-resonant polyphase motor of FIG. 8.

FIG. 14A is a diagrammatical representation of a polyphase induction motor with regulated magnetic symmetry with a parallel floating quasi-resonant circuit. The primary stator windings are connected in a wye configuration to the source, its parallel, floating windings are connected in a wye configuration, and the capacitors in the floating circuit are connected in a Δ configuration.

FIG. 14B is an electrical representation of a polyphase induction motor with regulated polar magnetic symmetry including a parallel floating quasi-resonant circuit with its primary stator windings connected in a wye configuration to the source, its parallel floating winding are in a wye configuration and the capacitors in the floating circuits are in a Δ configuration.

Figure 18A:
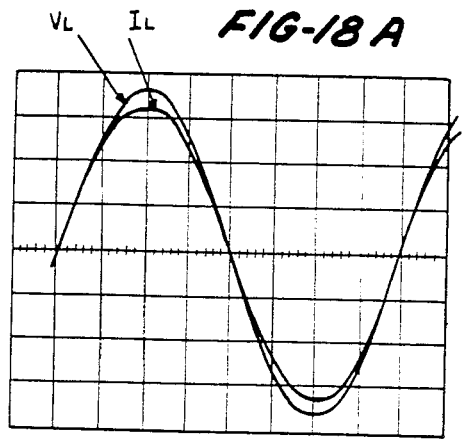

FIG. 18A is an oscilloscope trace of the line supply voltage and the line current of one phase at full load in a 40 horsepower, three-phase, quasi-parallel floating resonant induction motor.

Figure 18B:
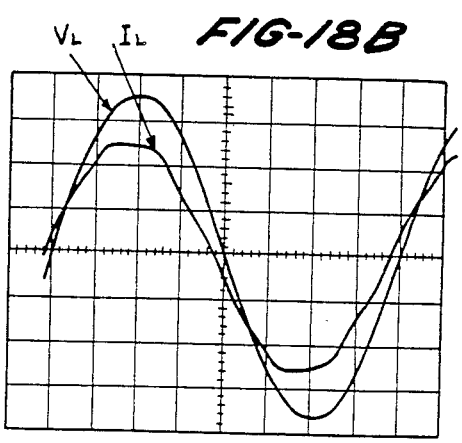

FIG. 18B is an oscilloscope trace of the line supply voltage and the line current of one-phase at 75% load in the quasi-parallel floating resonant induction motor.

FIG. 19 is a phaser diagram of an ideal double-resonant motor with quasi-series resonance at full-load.

FIG. 20 is the phaser diagram of a ⅓ HP motor after conversion to a quasi-double-resonant motor with quasi-series resonance at full-load.

FIG. 21 is a phaser diagram of an ideal double-resonant motor with parallel resonance at no-load.

FIG. 22 is the phaser diagram of a ⅓ HP motor after conversion to a quasi-double-resonant motor with quasi-parallel resonance at no-load.

Figure 23:
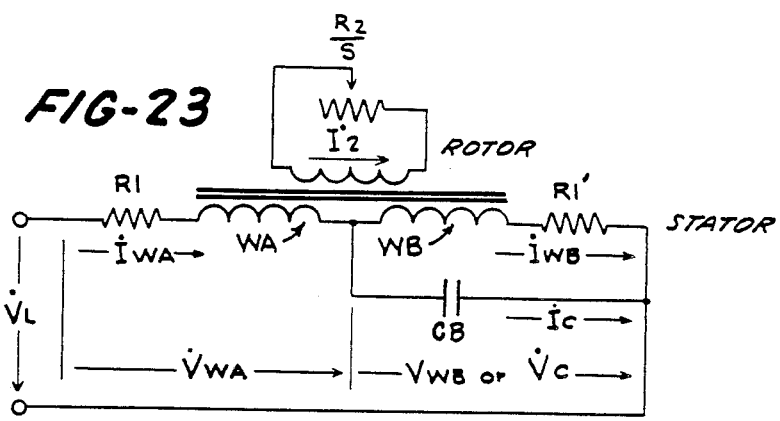

FIG. 23 is an electrical schematic diagram of a double-resonant motor incorporating the teachings of the present invention and used in conjunction with explaining FIGS. 19 through 22.

Figure 24:
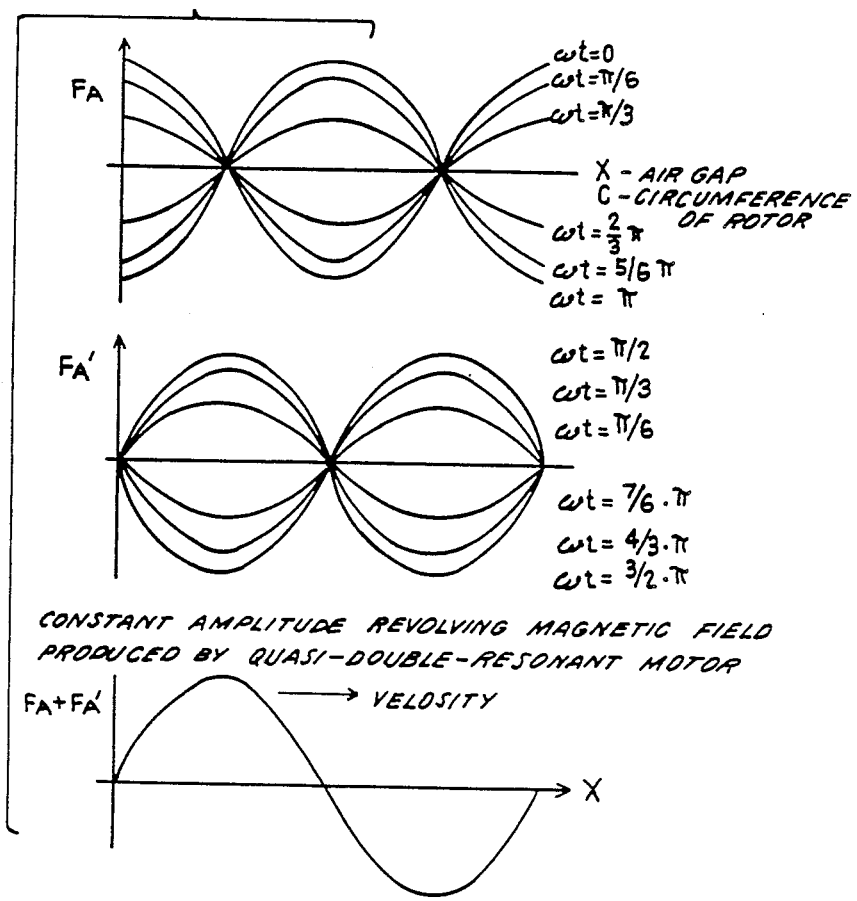

FIG. 24 is a representation of the magnetomotive force in the air gap surrounding the circumference of the rotor in a quasi-double-resonant motor. Each wave represents the force (flux) in the air gap over the circumference of the rotor at a given time in one cycle of the input power.

DETAILED DESCRIPTION OF THE PREFERRED EMBODIMENTS

Figure 1:
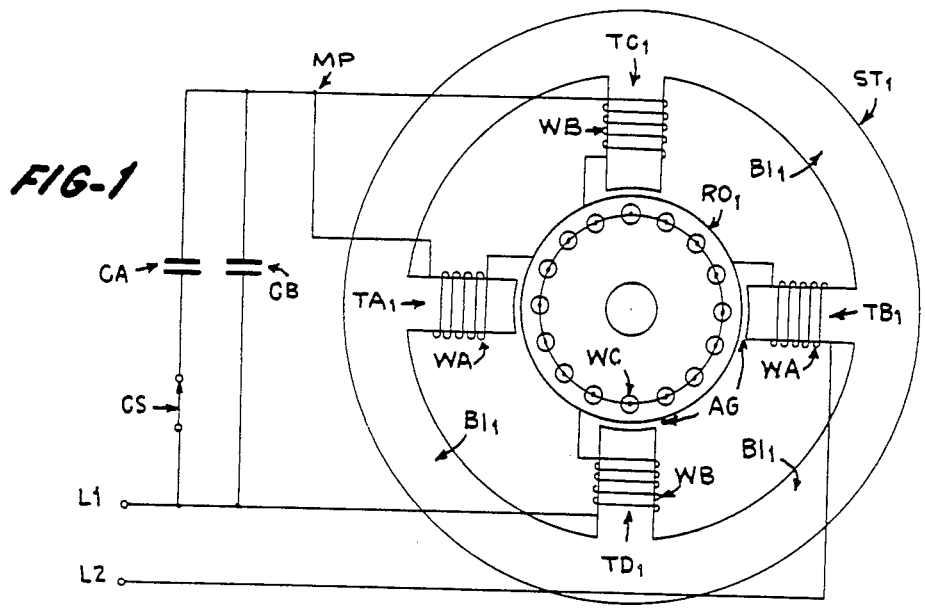
FIG. 1 is a diagrammatical representation of a single-phase motor with regulated magnetic polar symmetry.

FIG. 1 is a diagrammatical representation of a single-phase a.c. induction motor in a squirrel cage rotor configuration. Stator $ST_1$ is a generally hollow, cylindrically shaped, slotted structure of laminated sheet steel. A rotor $RO_1$ is rotatably disposed in the interior space of the stator and is of like material. For simplification, the stator is shown as having four polar areas or teeth $TA_1$, $TB_1$, $TC_1$, $TD_1$, protruding from a return magnetic path or back iron $BI_1$ of stator $ST_1$.

The actual number of poles or teeth is dependent upon physical size, horsepower and rotational speed. The physical dimensions of the motor and its integral parts are only graphically represented and the illustration does not necessarily indicate an optimum physical construction. The stator or primary is shown as having two windings WA and WB commonly referred to as "wound on" teeth $TA_1$, $TB_1$, $TC_1$, and $TD_1$. As is known, the stator windings are disposed in axially extending slots on the interior of the stator. Likewise, rotor windings WC are disposed in axially extending slots on the periphery of rotor $RO_1$.

Stator windings WA and WB are connected in series at midpoint MP and the serial circuit is connected across power input terminals $L_1$ and $L_2$. Midpoint connection MP is passively coupled to input terminal $L_1$ by means of two capacitors CA and CB. Capacitor CB is permanently coupled while capacitor CA is removed from the circuit by means of centrifugal switch CS when the motor reaches a predetermined speed during a start-up operation. When the motor is used for low torque applications, capacitor CA and centrifugal switch CS are omitted from the circuit.

Rotor winding WC is closely magnetically coupled to stator windings WA and WB by means of the four polar areas or teeth $TA_1$, $TB_1$, $TC_1$, $TD_1$, air gap AG, the magnetic material of rotor $RO_1$, and the return magnetic path or back iron $BI^1$.

The present invention provides a regulatory circuit that equalizes the polar magnetic regions about the rotor regardless of the magnitude of the electromotive force or its wave form. This axisymmetrical alignment of the magnetic flux reduces space harmonics in the air gap between stator and rotor allowing a greater net-usable flux to link the rotor windings. This symmetry reduces the possibility of negative sequential currents being established in the rotor and results in a higher torque rating for the motor without increasing hysteresis loss due to magnetic saturation. Increased efficiency is also achieved through intermediate transfer and storage of energy and a shorter current rise time in the resonant circuit as opposed to the induction/resistance ratio in prior art induction motors.

The amount of force or mechanical torque exerted on the rotor is based on the equation:

$$F = Bl\,I \qquad (1)$$

where F is the mechanical force, B is the magnetic flux density linking the rotor windings, l is the physical length of the windings and I is the current flowing in the windings. The greatest energy loss in a squirrel-cage, induction motor is heat produced as current flows through the windings due to the resistance of the windings.

The amount of loss is based on the formula:

$$I^2R \qquad (2)$$

where I is the Current in amperes, and R the resistance in ohms; therefore, by increasing the net-usable flux linking the rotor (e.g., increasing B and maintaining F and l constant in (1)), the current component I is reduced in the rotor resulting in less heat, longer bearing life and increased efficiency.

The reduction of space harmonics also reduces the eddy current effect present in all induction motors and generators. Since the resonant circuit does not return unused energy to the source but rather saves it primarily in the capacitor, it has an energy efficient topology due to its transfer of energy in phase to the rotor and transfer between bifilar phase pairs.

Since $V_{WB}$ is high and $I_L$ is low in the quasi-resonant circuit, core flux density is reduced and therefore hysteresis losses, eddy current losses and $I^2R$ losses are reduced below that of the standard motor design. This allows the motor to operate in the linear portion of the BH curve. Since $I_{WB}$ is high, the air gap flux is high and therefore the resultant torque much higher than for the standard motor. Under heavy loads energy to the rotor can be maximized because $I_C$ provides $-VARS$ in the stator with VARS in the rotor. Maximum energy transfer to the rotor takes place when $+Y(jw)$ rotor$=-Y(jw)$ stator is reached. This condition is prevalent in the present invention and particularly in the quasi-double-resonant equalizer circuit. Further, the energy transfer remains proportional throughout the entire load range of the motor, since the admittance of the rotor changes in proportion to its angular velocity. See FIG. 6 where the rotor current versus slip frequency curve.

Conductance G of a resonant circuit is governed by the equation:

$$Y = \sqrt{G^2 + (B_{eq.})^2} \; \underline{/\text{ARCTAN} (B_{eq.} - G)} \quad (3)$$

where Y is the admittance (the reciprocal of impedance) or overall ability to pass an alternating current, G equals the circuit conductance in siemens (the reciprocal of resistance) or the ability of a pure resistance to pass electric current, B equals susceptance in siemens (the reciprocal of reactance) or the ability of inductance or capacitance to pass alternating current $B_{eq} = B_c - B_L$ is the net equivalent susceptance in (3). As is known, the admittance of a circuit is equal to the conductance (the real component) plus the susceptance (the imaginary component):

$$Y(jw) = G(w) + jB(w) \quad (4)$$

At resonance the reactive power of the inductance is equal and opposite to that of the capacitance and the source of emf to supply only the power required by the resistance of the circuit. One important characteristic of the quasi-double-resonant circuit is it check-and balance network. FIGS. 19 through 22 contain vector diagrams for the quasi-double-resonant motor discussed in Tables 1, 2 and 3. FIG. 23 is an equivalent circuit for the motor for use in considering the vector diagrams of FIGS. 19 through 22. It will be apparent to those skilled in the art that at no-load the conditions exist wherein the currents in WB and CB are near equal and 180° apart, a condition referred to as parallel resonance. It will also be apparent that as the slip of the motor increases the resistance of the rot changes and, due to the magnetic coupling of the resonant windings to the rotor windings, the circuit moves from a near parallel resonant condition to one that more closely resembles the conditions that exist at series resonance. Since the circuit still conducts current at no-load it is not at theoretical parallel resonance and, therefore, it is referred to as quasi-parallel resonance. At full-load maximum current does not flow, or in other words, the current is not limited by only the resistance of the circuit and so theoretical series resonance does not exist. The circuit is therefore called a quasi-series resonant circuit. Since at both parallel resonance and series resonance the reactance of the circuit is concelled unity power factor exists. Because this condition exists in this unique circuit it is referred to as a quasi-double-resonant circuit. The circuit maintains control of both current and voltage in each winding and adjusts to maintain optimum magnetic flux conditions in each of the polar areas. This creates a perfectly round and constant amplitude, revolving flux wave in the air gap as can be seen in FIG. 24. This condition is necessary in order to allow less magnetic loss and increased efficiency. As shown in FIG. 24, the top set of curves covers the situation where FA is the flux in the air gap created by winding WA and the center set of curves covers the situation where FA' is the flux component created in the air gap by winding WB. The bottom curve represents FA and FA'. As can be seen in FIGS. 19 through 24, at quasi-resonance the vector sum of the voltage drops across the capacitor CB and inductor of the series branch (winding WA) equate to line voltage and likewise the vector sum of the currents of the quasi-parallel branch (CB and WB) equate to line current. This system maintains an even distribution of power between the two branches, as can be noted in Table 3. The ratio between the reactive power of either the inductance or the capacitance at resonance and the true power of the entire resonant circuit is called the Q factor of the circuit. The symbol for resonant frequency is "$f_r$". Since at resonance, the reactance of the capacitor equals that of the inductor ($X_L = X_c$), from:

$$2\pi f L = \frac{1}{(2\pi f c)} \quad (5)$$

the following equation can be derived:

$$f_r = \frac{1}{(2\pi \sqrt{LC})} \quad (6)$$

where $f_r$ is in cycles per second, L is in henrys, and C is in farads. Equation (6) shows that an RLC circuit can be brought into resonance at a certain frequency by varying either the inductance or capacitance. It should be noted that the resistance of the series resonant circuit has no bearing on the resonant frequency $f_r$.

The resistance governs only the Q and the minimum impedance of the circuit at resonance and, as a result, the height of the resonance curve changes as noted in the curves illustrated in FIG. 7A. Also in FIG. 7A, as long as the product of L and C is constant, the resonant frequency of a series circuit is constant. However, if we increase the L/C ratio by a factor of 4:1 (see FIG. 7B), the result will be a steepening of the "skirts" of the resonance curve. Decreasing the resistance in a series resonant circuit and increasing the L/C ratio both have the effect of steepening the "skirts" of the curve by changing its height and narrowing the resonant frequency bandwidth.

In a.c. circuits containing both inductance and capacitance, the instantaneous energy ($\frac{1}{2} CV^2$) is stored in the capacitor as a voltage increase, while the energy in the inductor ($\frac{1}{2} LI^2$) is stored as a current increase, alternately, twice each cycle. Therefore, an exchange of reactive energy takes place between the inductance and capacitance. The source of emf (the energy supplied to the motor) is required to supply only the difference between the reactive energy of the inductance and the reactive energy of the capacitance. This accounts for the net reactance of a series circuit being the difference between the inductive and capacitive reactance:

$$X_{NET} = X_L - X_C \quad (7)$$

and the reactive voltage of a series circuit being the difference between voltage of the inductance and the voltage of the capacitance. Reactance is the imaginary component of impedance whereas resistance is the real component thereof. This should be compared with (4).

The Q factor of a resonant circuit is the ratio of reactive power to power dissipated in the resistance. In the present case the resistance is a representation of the mechanical load on the motor.

The resonance curve of the parallel branch or quasi-parallel resonant circuit (CB and WB) is shown in FIG. 7C and is generally the inverse function of the series resonant curve. Since the Q of the parallel winding has the inverse effect on the circuit as compared with the Q of the series winding, the quasi-parallel resonant circuit is balanced with the quasi-series resonant circuit and any instantaneous energy imbalance in one of those circuits is very quickly compensated for by the other circuit. This produces the balanced rotating magnetic flux wave around the rotor, as illustrated in FIG. 24.

The sensitivity of a resonant circuit can be increased by an increase in the Q of the circuit or decreased by a decrease in its Q. Purposely reducing the Q of a tuned circuit is called damping and when the Q=½, the result is called "critical damping." An example of critical damping is the damping of the movement of a pointer in a meter to keep the pointer from oscillating. It is possible then to capitalize on this characteristic of resonance in the quasi-double-resonant induction motor. By appropriate selection of the Q factor: energy transfer to the rotor can be controlled, as well as energy supplied from the source. In-rush current can be reduced since Q is the admittance magnification factor, and an even distribution of power from all associated motor windings can be maintained.

Figure 2:
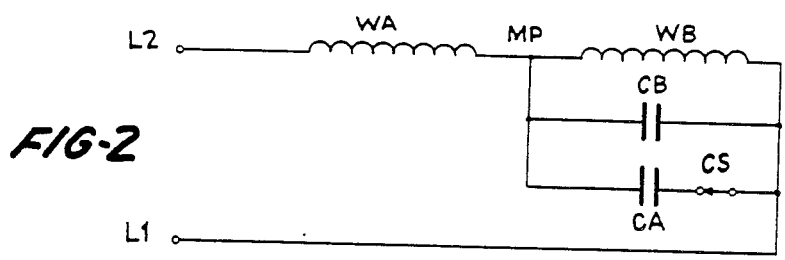
FIG. 2 is an electrical schematic diagram of the single-phase motor of FIG. 1, but the circuit does not include representations of the stator core material or the rotor material.

The operation of a single-phase, quasi-double-resonant induction motor as shown in FIGS. 1 and 2 will now be is described. When an a.c. potential is applied to input terminals L1 and L2, capacitors CA and CB begin to charge, capacitor CA being in the circuit due to the closure of centrifugal switch CS. This charging current flows through winding WA sets up a flux path which flows horizontally through teeth $TA_1$ and $TB_1$, their respective air gaps AG, rotor $RO_1$ and the return magnetic path or back iron $BI_1$. When current begins to flow in winding WA, capacitor CB begins to charge and a potential also starts building across primary winding WB approximately 90° out of phase with the potential across WA. See FIG. 3A where $V_{WA}$ leads $V_{WB}$ by 90°. Therefore, when the current of WA has reached its highest magnitude, the potential across WB has also reached its peak and current flows in winding WB.

Figures 3A, 3B:
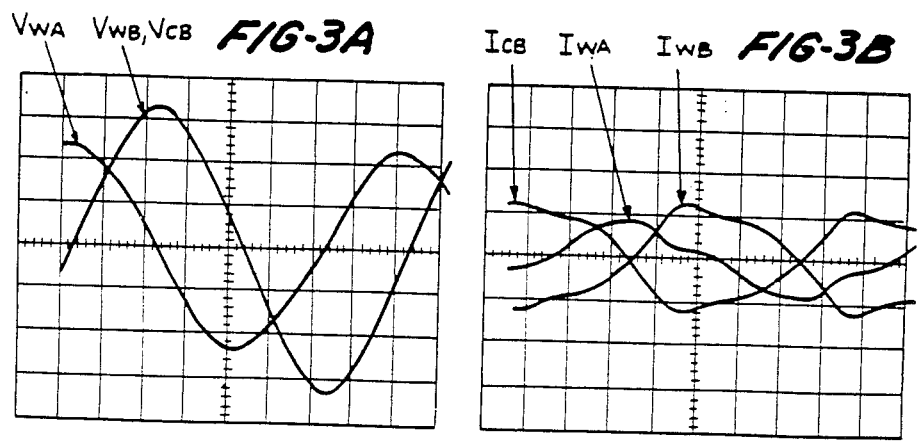
FIG. 3A is an oscilloscope trace of the voltage waveforms associated with each of the stator windings (and the capacitor) when the oscilloscope is set to trigger on the positive going slope of the supply line voltage.
FIG. 3B is an oscilloscope trace of the current waveforms associated with each of the stator windings and the capacitor when the scope is also set to trigger on the positive going slope of the supply line voltage.

FIGS. 3A and 3B show certain phase relationships for a single-phase motor with regulated magnetic polar symmetry. In the example shown, the motor is a double-resonant ¼ horsepower motor with 120 volts a.c. input.

FIG. 3A is a representation of the voltages across WA and WB, respectively. The representation clearly shows the phase relationships between $V_{WA}$, $V_{WB}$ and $V_{CB}$ and this phase relationship creates a balanced rotating magnetic field. The traces in both FIGS. 3A and 3B begin at the positive going slope of the voltage supplied to the motor. These have shown that $V_{WA}$ lags the supply voltage $V_L$ by approximately 45°. Turning to FIG. 3B, as the current $(I_{WA})$ in WA decreases and $I_{WB}$ builds in WB, the energy stored in the magnetic field of winding WA together with energy stored in capacitor CB, is transferred to winding WB and a rotating magnetic flux have is created.

This wave rotates from the horizontal polar axis already established in the motor magnetic material, to a vertical position centered through stator teeth $TC_1$ and $TD_1$, their respective air gaps, the rotor magnetic material, and the return magnetic path or back iron $BI_1$. This rotating flux wave cuts the rotor windings WC in rotor $RO^1$ which causes current to flow and consequently establishes a magnetic field in the rotor which tries to align itself with the rotating magnetic flux wave established in the stator $ST_1$ magnetic material.

FIG. 3B is a representation of the current wave forms $I_{CB}$, $I_{WA}$ and $I_{WB}$ which flow in capacitor CB and stator windings WA and WB, respectively. $I_{WA}$ and $I_{WB}$ display a full 90° phase shift with respect to each other and $I_{CB}$ is 180° out of phase with respect to $I_{WB}$. Representations in FIGS. 3A and 3B have the same time base; therefore, a direct comparison between the voltages and currents can be made.

When the current in WB ($I_{WB}$) has reached its peak it begins to decrease releasing the energy stored in its magnetic field to the rotor winding or to capacitor CB. Additional energy from the source through winding WA is also stored in the capacitor CB. This pattern continues throughout each cycle of alternating current, advancing the rotating magnetic wave one full revolution for each cycle. Although the illustration shows four poles, the motor is considered a two-pole motor because for every quarter cycle, the magnetic field advances one quarter of a revolution.

Figure 6:
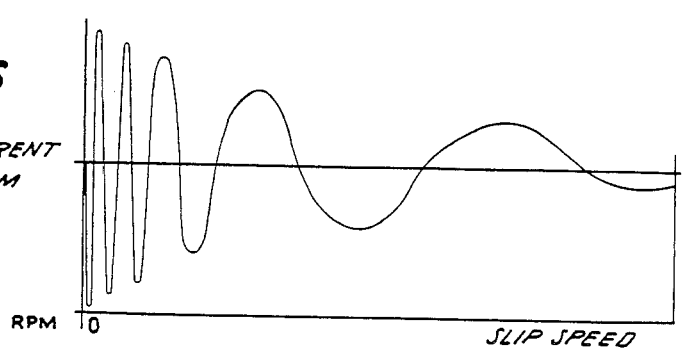
FIG. 6 is a graphic representation of the rotor current versus slip speed in the induction motor of FIG. 1.

When the motor is at rest or in a stalled condition, if voltage is applied to input L1 and L2, the net equivalent susceptance $B_{eq}$ is high since the rotating magnetic flux wave is cutting all of rotor windings in WC at the maximum rate. This causes a considerable amount of current to flow in both stator and rotor windings, which generate mechanical torque in an attempt to bring the rotor into synchronism with the rotating magnetic field. As the speed of the rotor increases, the rate at which the windings WC are cut decreases and the net equivalent susceptance lowers until it reaches a theoretical 0 at synchronous speed. FIG. 6 shows the rotor current versus slip frequency curve. In a locked rotor condition, the current through the stator and rotor windings has the same frequency as the line current. At no-load and as the motor approaches synchronous speed, the rotor current has a frequency near 0.

Since rotor windings WC have a high coefficient of coupling to the stator windings WA and WB, any unused energy in rotor windings WC is transferred through the magnetic coupling and stored in the reactive elements of the quasi-double-resonant equalizer circuit (WA, WB and/or CB) during oscillating load conditions. This feedback also tends to control the Q factor of the resonant circuit in regulating the amount of energy needed from the supply (FIG. 6). Notice that at locked rotor (ORPM) the rotor current frequency is the same as line frequency, but it decreases with speed of the rotor until at synchronous speed it too becomes 0.

Certain facets of the resonant circuits are important. First, examine closely the quasi-series resonant branch which consists of winding WA and capacitor CB. In FIG. 20, with full load, at first glance a condition seems to exist which violates Kirchhoff's voltage law. Measurement of the voltage drops across WA and CB, which is the same as $V_{WB}$, determines that they are almost equal. This may infer that the total is double that of the source. The series resonant circuit does not violate Kirchhoff's law since the vector sum of WA and CB equate to the input voltage, as shown in FIGS. 19 through 22.

The ability of the quasi-series resonant circuit to produce a voltage higher than the applied voltage is one of the most important characteristics of the circuit. This is possible due to its ability to store unused energy in WA and CB. In the series portion of the circuit, Q is the magnification (admittance) factor which determines how much the voltage across WA and CB can increase above the applied voltage.

To separately consider the parallel branch of the quasi-double-resonant equalizer circuit which consists of WB and CB. In FIG. 22, at no-load, the current in CB leads the voltage across it by 90° and the current in WB lags its applied potential by 84.2°. Since CB and WB are parallel, the same potential appears across both (FIG. 3A) and therefore the currents are out of phase by 174.2°. This shows that when the current is flowing in one direction through WB, an almost equal current is flowing in the opposite direction through CB, as shown in FIG. 22.

Applying Kirchhoff's current law to midpoint MP, it is noted in FIG. 21 that there is no current flowing into or out of the source at parallel resonance. The current simply oscillates back and forth between the capacitor and winding. In the ideal parallel resonant circuit, the source voltage would only be required to start the oscillation. Once started, the source could be removed and the circuit would continue to oscillate indefinitely. Since the parallel resonant circuit displays inverted characteristics to that of the series resonant circuit, it is sometimes referred to as antiresonance. This condition exists, however, only if there are no losses in the circuit.

There are losses in the quasi-double-resonant induction motor; the greatest loss being useful energy delivered to the load, but another loss to be minimized is that caused by current flowing through the resistance of the windings. Therefore, energy must continually be added from the source.

This ability of a parallel resonant circuit to sustain oscillation after the source voltage is removed is sometimes called the "flywheel effect" and is an important feature in the motor circuit since for every oscillation a magnetic field is built around WB. When this field collapses the energy in the magnetic field induces an electromotive force (V) in CB. This method of energy transfer is a most efficient topology since it is intermediate in nature and does not return unused energy to the source. Since the two stator windings are in series and the two resonant circuits are basically opposites (FIGS. 7A and 7C), they tend to electrophysically control or regulate each other. The end result is an induction motor with regulated magnetic polar symmetry over its entire range of points.

Figure 4A:
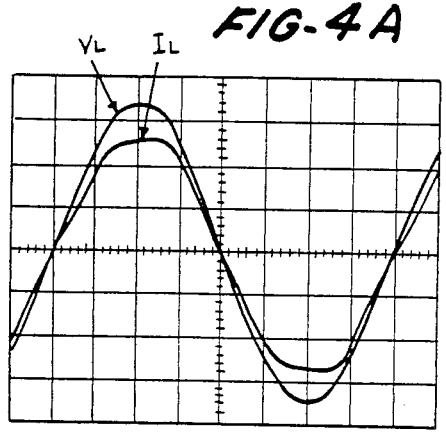
FIG. 4A is an oscilloscope trace of the line supply voltage $V_L$ and the line current $I_L$ at approximately full load for a ¼ horsepower motor supplied with 120 volts a.c.
Figure 4B:
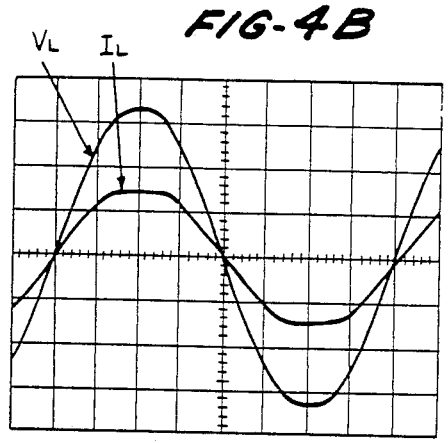
FIG. 4B is an oscilloscope trace of the line supply voltage and the line current at approximately half-load.
Figure 4C:
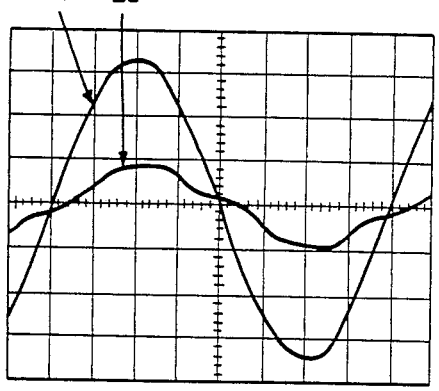
FIG. 4C is an oscilloscope trace of the line supply voltage and the line current at no-load.
Figure 5:
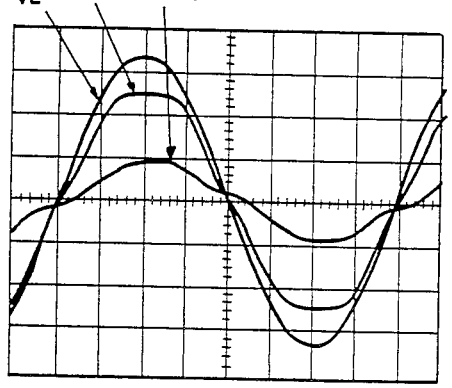
FIG. 5 is a time-lapse illustration of an oscilloscope trace of the line supply voltage and line current over the entire load range of the motor.

FIGS. 4A, 4B and 4C are representations of the current (line current $I_L$) relationship with respect to the applied electromotive force (line voltage $V_L$) in a single-phase motor with regulated magnetic polar symmetry of the same type as referred to with reference to FIGS. 3A and 3B. FIG. 4A is at approximately full load, FIG. 4B is at approximately half load and FIG. 4C at no-load. It should be noted that line current $I_L$ remains closely in phase with the line voltage $V_L$. Consequently, the power factor of the circuit is near unity over the entire load range. FIG. 5 is a time exposure representation of the entire load range for the single-phase motor of FIGS. 3A and 3B.

FIG. 5 shows the phase relationship of line voltage and current throughout the entire load range.

Another unique and desirable characteristic of the motor is the flattened current wave form $I_L$. Since $I_L$ is non-sinusoidal, its RMS or effective value is considerably higher than that of a sine wave with the same peak value and results in a magnetic field that remains high for a long time without saturating the iron. This maintains high torque and reduces the hysteresis losses in the magnetic core material. The motor operates in the linear portion of the BH curve.

The present invention virtually eliminates the preponderance of current problems associated with conventional induction motors and generators. It is to be noted that, although the description of the invention is made in reference to a motor, the device can operate as a generator if torque is applied to the rotor and the device is driven above synchronous speed. The generator need not be supplied with reactive power since the power factor of the device is unity. The claims are meant to encompass this usage of the device.

The conventional polyphase motor has by design a rotating magnetic flux wave which is unregulated and under certain operating conditions it can become distorted non-symmetrized.

This distortion or magnetic irregularity effects a decrease in the operating efficiency of conventional motors. The present invention provides a regulatory circuit to equalize the polar magnetic regions regardless of the magnitude of electromotive force or its wave form. This axisymmetrical alignment of the magnetic flux reduces undesired space harmonics in the air gap between stator and rotor allowing a greater net-usable flux to link the rotor windings as illustrated in FIG. 24.

Magnetic symmetry reduces the hazards of negative sequence currents being established in the rotor and results in a higher torque value without increasing hysteresis loss due to magnetic saturation. Increased efficiency is also achieved through intermediate transfer and storage of energy and a shorter current rise time in the resonant circuit as opposed to that in a standard motor.

The polyphase motors are discussed below. Some important characteristics of the quasi-double-resonant circuit are its check and balance network, its ability to produce a rotating magnetic vector, and the ability of the circuit to act as a phase doubler. Therefore, coil placement should be so as to enhance the rotating sinusoidal magnetic wave. One example of proper coil placement is shown in FIG. 8, but it should be understood that coil arrangement and number of poles can be varied so as to produce a motor having different operating characteristics. Hence, the invention is not limited to the illustrated embodiment in FIG. 8. As with the single-phase motors of the present invention, at quasi-resonance the vector sum of the voltage drops across the capacitor and inductor of the quasi-series branch equate to line voltage (FIG. 19) and further the vector sum of the currents of the quasi-parallel branch equate to line current (FIG. 19).

Two electrical schematics of the quasi-double-resonance polyphase motor are illustrated in FIGS. 9 and 10. The configuration shown in FIG. 9 is diagrammatically illustrated in FIG. 8. In FIG. 8, the windings of each quasi-resonant circuit are separated by 90° electrical. It needs to be understood that this angle can be adjusted to produce different torque and operating characteristics for the motor.

FIG. 8 is a diagrammatical representation of a quasi-double-resonant polyphase a.c. induction motor of the squirrel cage design. It has a sheet-steel laminated stator $ST_2$ and a rotor $RO_2$ of like material. For simplification, the stator is shown as having 12 poles or teeth TA, TB, TC, etc., through and including TL protruding from a return magnetic path or back iron $BI_2$; the actual number of teeth being dependent upon physical size, horsepower, and rotational speed. The physical dimensions of the motor and its integral parts are for graphical representation only and do not indicate its optimum physical construction.

The stator is shown as having three sets of quasi-double-resonant circuits or one set per input phase. The first quasi-double-resonant circuit consists of serially connected windings WBa and WAa are wound on teeth TA, TB, TC, and TD with the windings being connected in series at midpoint MPa across inputs A and B.

With the windings thus connected, the midpoint is then passively coupled to input terminal A by means of capacitor CBa, i.e., in parallel to winding WBa and in series with WAa. The rotor winding WC is magnetically coupled to the stator windings WBa and WAa by means of the four polar areas or teeth TA, TB, TC, TD, their respective air gaps AG, the rotor magnetic material RO$_2$ and the return magnetic path or back iron BI$_2$.

The second set of quasi-resonant windings WBb and WAb are connected to input terminals B and C. They are wound on teeth TE, TF, TG and TH and are likewise connected in series at midpoint MPb, the connection of which is passively coupled to input terminal B by means of capacitor CBb. The rotor winding WC is also closely coupled to the stator windings WBb and WAb by means of the four polar areas or teeth TE, TF, TG, TH, their respective air gaps AG, the rotor magnetic material RO$_2$ and the return magnetic path or back iron BI$_2$.

The third set of quasi-resonant windings WBc and WAc are connected to input terminals A and C. They are wound on teeth TI, TJ, TK and TL, and are connected in series at midpoint MPc. The midpoint connection MPc is passively coupled to input terminal C by means of capacitor CBc. The secondary winding WC is closely coupled to the primary windings WBc and WAc by means on the four polar areas or teeth TI, TJ, TK, TL, the respective air gaps AG, the rotor magnetic material RO$_2$ and the return magnetic path or back iron BI$_2$.

The operating principles of the quasi-double-resonant polyphase motor shown in FIG. 8 are as follows. When a polyphase a.c. potential is applied to input terminals A, B, and C, with A being 0 and going positive, capacitor CBa begins to charge. This charging current flows through winding WAa setting up a magnetic flux path through stator teeth TC and TD, their respective air gaps, the rotor magnetic material and the return magnetic path or back iron BI$_2$. At the same instant of time, since three phases are acting on the stator concurrent a condition exists similar to that shown in FIG. 11A.

FIGS. 11A through 11L illustrate current and flux paths through a standard induction motor for a full revolution in increments of 30°. These figures are presented to help explain the very complex conditions that exist in the motor and particularly in the quasi-double-resonant induction motor. Although both prior art induction motors and the present invention develop a rotating magnetic flux wave, the flux wave in the conventional motor is not necessarily symmetrical or balanced under all operating conditions as is the wave in the present quasi-double-resonant motor. In FIGS. 11A through 11L, solid lines and dashed lines represent current flow through the stator windings and the dash-dot-dash lines represent the magnetic flux paths through the stator and the rotor. One of the differences in a structural sense between the conventional polyphase induction motors and the induction motor constructed in accordance with the principles of the present invention is that the quasi-double-resonant induction motor, for example, has a winding circumferentially interleaved between the stator windings coupled to power input terminals A and B.

It should be noted that windings which are serially connected with respect to the capacitor are identified by "A" in the term "WAa" whereas the lower case letter refers to the phase of the winding. Hence, considering stator windings WAa and WBa, both these stator windings are serially connected together with respect to one another because of the term "a," winding WAa is serially connected to capacitor CBa and stator winding WBa is parallelly connected to capacitor CBa.

Returning to FIGS. 11A through 11L, one of the physical differences between the conventional motor and the motor of the present invention is that the present invention includes an additional winding interposed between the two primary stator windings. Referring to FIG. 11A, the circumferential disposition of teeth TA, TK and TE is shown in the figure. Referring jointly to that figure and FIG. 8, power input phase A is applied to winding WBa wound on tooth TA at the same time that current flows through winding WBb wound on tooth TE. However, winding WAc is wound on tooth TK, as well as tooth TL, and that winding is circumferentially interleaved between windings WBa and WBb. The circumferential location of the other teeth of the stator is not shown in FIG. 11A in order to simplify the drawing.

FIG. 11B illustrates that the rotor has turned 30° clockwise due to the rotating magnetic flux wave. In this instance, flux waves cut stator winding WAc wound on tooth TK as well as tooth TL.

As soon as the potential between power terminals A and B has reached its peak, the energy stored in capacitor CBa begins to discharge into winding WBa. This energy together with that stored in the magnetic field of WAa is to winding WBa setting up a magnetic flux path through teeth TA and TB, their respective air gaps, the rotor return magnetic material and the return magnetic path or back iron BI. This flux path would be similar to that shown in FIG. 11L that illustrates in general sense the motor at 330°. A potential is also building in a positive direction with respect to terminal C, thus causing current to flow in stator winding WAc in an attempt to charge capacitor CBc. As this current begins to flow in WAc, the magnetic field in WBc begins to collapse and the energy stored in WBc together with the energy now flowing in winding WAc is stored in capacitor CBc and in the new magnetic field in WAc. This moves the position of the magnetic flux wave 30° clockwise to that shown in FIG. 11A at 0°. This process continues as long as the polyphase source is applied to the motor terminals A, B and C. Consequently with each new cycle of alternating current, the windings in the motor marked with the prefix WA, i.e., WAx where x is a, b or c (the windings serially connected to the capacitors), pass an electric current in an attempt to charge their respective capacitors. Therefore, a magnetic field is established in these windings and an electric field or potential is developed across the associated capacitors.

With the collapse of each magnetic field in the motor, the energy stored in the field is converted to an electric current which is stored either in its related winding pair or its associated capacitor. On the other hand, as each capacitor discharges, the stored energy is converted to an electric current which flows through either of its related windings.

Hence, a very efficient system for regulated transfer and exchange of energy is established and, at the same time, a rotating field is created similar to that shown in the diagrams of FIGS. 11A through 11L. The magnetic center of the rotating flux wave moves one tooth in the clockwise direction for every 30° advance of the polyphase source. It can also be seen, that a check and balance network exits. Excess energy from any phase in the circuit is transferred directly or indirectly to another part of the network, since all windings have a high coefficient of coupling to each other. This balanced rotating flux wave or pattern continues throughout each cycle of alternating current, advancing the rotating magnetic flux wave one full revolution.

When the motor is at rest or in a stalled condition, if a polyphase source is applied to motor terminals A, B and C, the net equivalent susceptance is high since the rotating magnetic flux wave is cutting all of the rotor windings in WC. This causes a considerable amount of current to flow in both stator and rotor windings most of which is converted to mechanical torque in an attempt to bring the rotor into synchronism with the rotating magnetic field. As the speed of the rotor increases, the rate at which the windings are cut and the net equivalent susceptance lowers until it reaches a theoretical 0 at synchronous speed. Since rotor windings WC are closely magnetically coupled to the primary stator windings, any unused energy in rotor windings WC is returned through the magnetic coupling and stored in the reactive elements (WAx, WBx or CBs, where x is a, b or c) or the stator circuitry as explained earlier. This feedback also adjusts the Q factor of the resonant circuit which regulates the amount of energy needed from the supply. At locked rotor or ORPM the frequency of the rotor current is the same as line frequency, but as FIG. 6 shows it decreases with speed of the rotor until at synchronous speed it too becomes 0.

FIGS. 12A and 12B are representations of the relationship between the line current ($I_L$) and the applied electromotive force (line voltage $V_L$) for one phase of the three phase power line connected to the quasi-double-resonant, polyphase motor, which is a double-resonant 40 horsepower motor. The power input was 460 volts three-phase. FIG. 12A is the relationship of line voltage with respect to line current at approximately full load, FIG. 12B is the relationship of line voltage with respect to line current at approximately 75% load. It should be noted that the line potential $V_L$ is in phase with the line current $I_L$ and that the power factor of the circuit is near unity over the entire load range as illustrated in FIG. 5.

Another unique and desirable characteristic is that of the flattened wave form in the current component. Since $I_L$ is non-sinusoidal, its RMS or effective value is considerably higher and results in a magnetic energy transfer that is consequently more intense than that produced by a standard sine wave of current. This reduces the hysteresis loss in the magnetic core material due to the fact that the current does not drive the core into saturation to accomplish the same work as some conventional motors, thereby reducing the coercive force or energy needed to return the magnetic material to 0. The reduction of harmonics also tends to reduce eddy current losses in the magnetic core material.

In working with the quasi-double-resonant polyphase motor, it was discovered that the quasi-double-resonant equalizer circuit seems to limit the use of the polyphase motor, since the rotation of the motor could not be changed simply by reversing the input phase sequence as is common with the present day standard design (A-B-C change to A-C-B). Also different operating voltages require a variation in the amount of capacitive reactance needed to maintain the proper Q factor.

The disadvantages can be overcome with a switching network shown in FIG. 13. Switching of rotation of the motor is accomplished by two reversing contactors (C1, C2) and (C3, C4). C1 and C3 are closed while C2 and C4 remain open for one direction of rotation. The reverse switching situation exists for rotation in the opposite direction. The network basically consists of two reversing motor contactors connected such that the top two reverse the phase sequence and bottom two reverse the windings with respect to the phase change.

By sacrificing the admittance magnification factor of the series resonance branch, similar result. i.e., a balanced rotating magnetic flux is achieved by connecting the primary stator windings directly to the input polyphase source, e.g., winding, WAa to terminal A and the neutral point forming a wye configuration as in FIG. 14B; a secondary stator winding, being connected in a Δ (FIG. 15) or wye (FIG. 14B) configuration and left floating or closely magnetically coupled to the primary stator winding, e.g., WBa'. The angular displacement of each winding can be modified to give the motor different operating characteristics. Hence, the invention is not limited to any set angular displacement of the windings.

The parallel floating concept is shown in the electrical schematic of FIGS. 14A, 14B, 15, 16 and 17. Since the floating stator windings (secondary) are only inductively coupled to the power source, turns of the secondary can be chosen so as to allow the most economical amount of capacitive reactance to be used. The capacitor CBx, x being a, b or c, is connected in parallel with WBx so as to form a parallel resonant circuit, the Q factor of which is determined similar to that of the quasi-double-resonant circuit.

The combination of the floating quasi-parallel resonant circuit and phase winding operate in similitude to that of the quasi-double-resonant circuit. Energy is transferred magnetically between bifilar pairs and the rotor winding. The source sees the primary winding as one having 0 reactance or unity power factor and therefore has to supply only the power required by the mechanical torque of the rotor and the resistance of the circuit. The circuit allows for change in rotor rotation by simple reversal of the incoming phase sequence. A dual voltage primary can also be used without changing the capacitive reactance of the resonant circuit.

The quasi-double-resonant polyphase motor can be used in applications which require greatly reduced inrush current control but do not need to be reversible in their operation. For motors needing higher starting torque and the capability of being readily reversible, the floating parallel resonant motor is more suitable.

The secondary stator windings WBx can also be connected as though they were individual single-phase circuits. Each of these connections gives the motor different operating characteristics, such as that achieved with wye- Δ starting etc.

FIG. 14A is a diagrammatical representation of a parallel-resonant or parallel floating polyphase, a.c. induction motor having a squirrel cage rotor design. The motor includes a sheet-steel laminated stator $ST_2$ and a rotor RO of like material. For simplification, the stator is shown as having twelve poles or teeth TA, TB, TC, etc., through and including TL protruding from a return magnetic path or back iron $BI_2$; the actual number of teeth being dependant upon physical size, horsepower and rotational speed for the motor. The physical dimensions of the motor and its integral parts are only graphically represented herein and hence the illustrations do not indicate the motor's optimum physical construction. The stator includes three primary phase windings which can be connected to the source in a Δ or wye configuration and three sets of floating parallel resonant circuits, one set per input phase. The three primary phase windings WAa', WAb' and WAc' are connected to input terminals A, B and C in the wye configuration.

Figure 15:
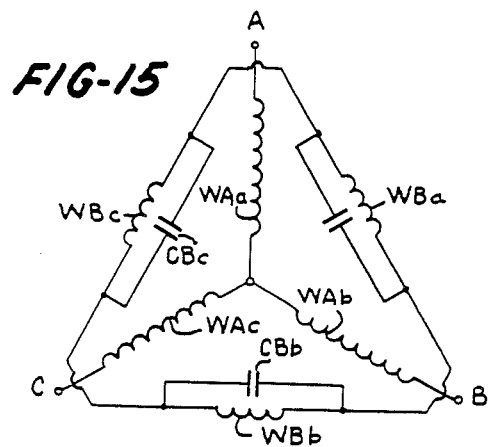
FIG. 15 is an electrical diagram of the polyphase, parallel floating quasi-resonant induction motor wherein the primary stator windings are in a wye configuration with respect to the inputs and the parallel floating stator windings and capacitors are in a Δ configuration.
Figure 16:
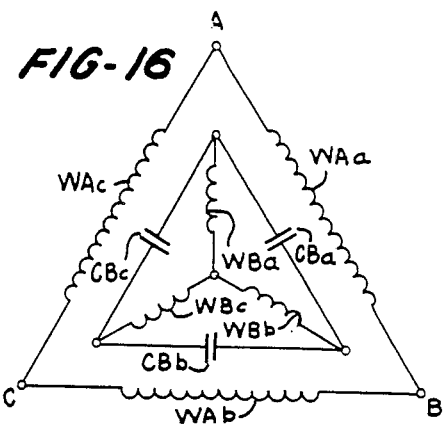
FIG. 16 is an electrical schematic diagram of a polyphase induction motor with regulated polar magnetic symmetry having a floating quasi-parallel resonant design with its primary phase, stator windings connected in a Δ configuration with the source, its parallel floating resonant stator windings connected in a wye configuration and the capacitors in the floating circuits are in a Δ configuration.
Figure 17:
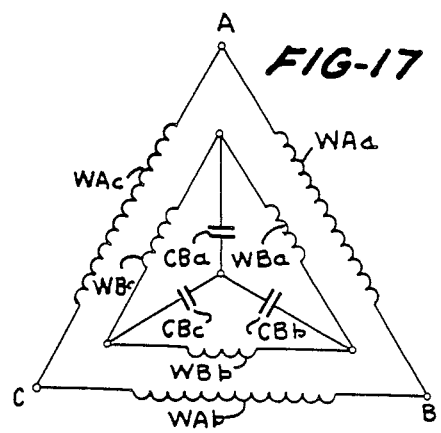
FIG. 17 is an electrical schematic diagram of a polyphase, parallel floating induction motor wherein the primary stator windings are in a Δ configuration, the secondary stator or parallel floating windings are in a Δ configuration and the capacitors in the floating circuits are in a wye configuration.

Three secondary stator windings WBa', WBb' and WBc' are part of the floating parallel resonant circuits and are connected in FIG. 14 in a wye configuration and in parallel with three capacitors CBa', CBb' and CBc' that are connected in a Δ configuration with respect to each other. In this circuit, capacitor CBb' is parallel to secondary stator windings WBb' and WBc'; however, as shown in FIG. 15, the parallel floating capacitor need only be parallel to one secondary stator winding to form the floating parallel resonant circuit.

The floating parallel circuitry consists of secondary windings WBa', WBb' and WBc' and capacitors CBa', CBb' and CBc'. The secondary stator windings are wound on teeth TC, TD, TG, TH, TK and TL, respectively. The primary stator phase windings WAa', WAb' and WAc' are wound on teeth TA, TB, TE, TF, TI and TJ, respectively. The secondary windings are circumferentially interleaved between the primary windings, e.g., WBa', is between WAa' and WAb'. The floating circuit is magnetically coupled to the primary phase windings and rotor RO. The actual phase displacement between the two primary winding sets can differ from that shown, producing everything from a close coupling to a near unity coupling. These variances effect desirable changes in motor operating characteristics and therefore the invention is not limited to the embodiment shown in FIG. 14A.

The following is a brief description of the operating principles of the motor shown in FIG. 14A. When a polyphase a.c. potential is applied to input terminals A, B and C, the primary phase windings, WAa', WAb' and WAc' produce a rotating magnetic flux wave similar to that shown in FIGS. 11A through 11L for the standard motor design, since they are connected to the source in similitude to the windings of the standard motor design. As this magnetic flux wave rotates in the stator's magnetic material the flux cuts the floating parallel windings WBa', WBb' and WBc' together with windings WC in rotor RO. This generates a potential in the windings of the floating circuit and causes a current to flow in them setting up a magnetic field in their associated teeth, their respective air gaps, the rotor magnetic material RO, and the return magnetic material or back iron BI$_2$. The energy stored in capacitors CBa', CBb' and CBc' is discharged into their respective windings in the form of an electrical current.

This ability of the quasi-parallel-resonant circuit to sustain oscillation reflects the flywheel effect and is a valuable feature of the motor. The parallel floating circuit not only provides the necessary magnetizing current but the circuit tends to equalize the polar magnetic energy since it is floating in nature and thus regulates the energy flow to the windings of the rotor. This provides an intermediate exchange or transfer of energy between bifilar windings and is consequently a most efficient topology. Since unused energy is stored in the reactive elements of the motor, the source need only supply the energy needed to provide the necessary mechanical torque and of course replace any expended energy. The motor therefore runs at or near unity power factor throughout its entire load range. See FIGS. 18A and 18B and note the flattened top of the current waveform $I_L$. FIGS. 18A and 18B show the relationship of line voltage with respect to line current at full-load and at 75% load, respectively, for a motor of the type discussed in connection with FIGS. 12A and 12B.

This current waveform is very desirable since the RMS energy level is higher than that of a sinusoidal wave resulting in more energy transfer within the same time frame. Thus a lower current component is needed resulting in less copper losses in the associated motor windings. Another important characteristic is the symmetry of the magnetic flux wave cutting the winding WC in the rotor RO. This symmetry or physiomagnetic regulation created by intermediate exchange of energy between bifilar windings results in a higher net magnetic coupling of the rotor and therefore reduced losses. This particular topology also allows for direct motor reversal without reconfiguration of the motor windings or elaborate switching mechanisms. Since the parallel branch windings are floating they are similar to that of the secondary of a transformer. This allows for a selection in both turns and connection which will reduce the cost and physical size of the capacitors needed for the appropriate Q factor. Although a three-phase motor is described herein, the claims are meant to cover polyphase motors configured in accordance with the principles of this invention.

In connection with the inventive features of the present invention, a ⅓ HP Marathon single-phase induction motor was put through several tests. Table 1 compares the performance of an original ⅓ HP Marathon single-phase induction motor and the same motor rewound incorporating the quasi-double resonant technology:

TABLE 1

⅓ HP Marathon Single-Phase Induction Motor-
Model:SPB56C17F5302A
Marathon versus Quasi-Double-Resonant

| Load | Before Conversion | | After Conversion | |
|---|---|---|---|---|
| | No Load | Full Load | No Load | Full |
| Horsepower | 0.00 | 0.3301 | 0.00 | 0.3303 |
| Line Voltage | 230.352 | 230.256 | 230.01 | 230.976 |
| Line Amperes | 2.5227 | 2.9492 | 0.5454 | 1.4455 |
| Line Frequency | 60.0 | 60.0 | 60.0 | 60.0 |
| RPM | 1792.8 | 1759.5 | 1795.2 | 1760.4 |
| Torque (oz. in.) | 0.0 | 11.82 | 0.0 | 11.82 |
| Watts | 154.7493 | 421.4933 | 122.0228 | 331.5053 |
| Volt Amperes | 581.1090 | 679.0709 | 125.4475 | 333.8758 |
| VARS | 560.1253 | 532.4243 | 29.1121 | 39.7151 |
| Power Factor | 26.63% | 62.07% | 97.27% | 99.29% |
| Efficiency | — | 58.4235% | — | 74.28% |
| Ambient Temp. | 22.2507 | 22.8080 | 22.4563 | 22.9109 |
| Case Temperature | 50.7649 | 51.1410 | 39.4897 | 39.7817 |

TABLE 1-continued

⅓ HP Marathon Single-Phase Induction Motor-
Model:SPB56C17F5302A
Marathon versus Quasi-Double-Resonant

| Load | Before Conversion | | After Conversion | |
|---|---|---|---|---|
| | No Load | Full Load | No Load | Full |
| Bearing Temp. | 45.0604 | 46.5713 | 36.3931 | 37.9134 |
| Breakdown Torque | 35.58 (oz. in.) | | 35.58 (oz. in.) | |
| Locked Rotor Torque | 37.62 (oz. in.) | | 54.42 (oz. in.) | |
| Locked Rotor Amperes | 15.37 | | 8.301 | |
| Sound Pressure Level | 85 dB SPL (Linear) | | 81 dB SPL (Linear) | |

Table 2 gives a comparison of the winding specifications of the original Marathon motor with those of the quasi-double resonant motor.

TABLE 2

⅓ HP Marathon Single-Phase Induction Motor -
Model: SPB56C17F5302A

| Span | Cord Factor | Turns | Effective Turns |
|---|---|---|---|
| | Marathon versus Quasi-Double-Resonant Winding Specifications | | |
| | Marathon Start Winding | | |
| 1-8 | .9807853 | 37 | 36.28906 |
| 1-6 | .8314693 | 33 | 27.43850 |
| 1-4 | .5555703 | 29 | 16.11154 |
| | Total Effective Turns/Pole | | 79.83910 |
| | Wire Size: 1#20 AWG | | |
| | Pole Displacement 90 Electrical Degrees | | |
| | Marathon Run Winding | | |
| 1-8 | .9807853 | 68 | 66.69340 |
| 1-6 | .8314693 | 52 | 43.23642 |
| 1-4 | .5555703 | 32 | 17.77825 |
| | Total Effective Turns/Pole | | 127.70810 |
| | Wire Size: 1#19 AWG | | |
| | Pole Displacement 90 Electrical Degrees | | |
| | Quasi-Double-Resonant Winding Specifications | | |
| | Double-Resonant Winding WA | | |
| 1-8 | .9807853 | 50 | 49.03927 |
| 1-6 | .8314693 | 54 | 44.89936 |
| 1-4 | .5555703 | 32 | 17.77825 |
| | Total Effective Turns/Pole | | 111.71690 |
| | Wire Size: 1#23 and 1#24 | | |
| | Pole Displacement 90 Electrical Degrees | | |
| | Double-Resonant Winding WB | | |
| 1-8 | .9807853 | 50 | 49.03927 |
| 1-6 | .8314693 | 54 | 44.89936 |
| 1-4 | .5555703 | 32 | 17.77825 |
| | Total Effective Turns/Pole | | 111.71690 |
| | Wire Size: 1#22 and 1#23 | | |
| | Pole Displacement 90 Electrical Degrees | | |

Table 3 gives test data on the Marathon motor after conversion of the motor to quasi-double-resonant circuitry.

TABLE 3

⅓ HP Marathon Single-Phase Induction Motor-
Model: SPB56C17F5302A
Data After Conversion To Quasi-Double-Resonant Circuitry

| | Voltage | Amperes | Power Factor | Watts |
|---|---|---|---|---|
| No-Load | | | | |
| Winding WA | 153.40 | 0.5458 | 72.87% | 61.0109 |
| Winding WB | 188.20 | 2.5760 | 12.50% | 60.6004 |
| Capacitor CB (43 mfd) | 188.20 | 3.0100 | 0.0009% | 0.5098 |
| Power Supply | 230.00 | 0.5458 | 97.27% | 122.1069 |
| Full-Load | | | | |
| Winding WA | 158.10 | 1.4410 | 69.00% | 157.1973 |
| Winding WB | 167.10 | 1.9660 | 53.00% | 174.0107 |
| Capacitor CB (43 mfd) | 167.00 | 2.6570 | 0.0009% | 0.3993 |

TABLE 3-continued

⅓ HP Marathon Single-Phase Induction Motor-
Model: SPB56C17F5302A
Data After Conversion To Quasi-Double-Resonant Circuitry

| | Voltage | Amperes | Power Factor | Watts |
|---|---|---|---|---|
| Power Supply Locked Rotor | 230.00 | 1.4410 | 99.9% | 331.0986 |
| Winding WA | 111.00 | 8.310 | 77.17% | 711.8238 |
| Winding WB | 153.10 | 10.960 | 70.19% | 1177.7714 |
| Capacitor CB (43 mfd) | 153.10 | 2.422 | .0003% | .1112 |
| Capacitor CA (145 mfd) | 153.10 | 8.550 | .0008% | 1.0472 |
| Power Supply | 230.00 | 8.310 | 98.93% | 1890.8491 |

All test procedures were conducted in compliance with IEEE standard 112-B. In the tests, Lebow torque sensors and Ohio Semitronics, Inc. watt transducers, voltage transducers and current transducers were all calibrated with test systems that are within current calibration requirements traceable to the U.S. National Bureau of Standards. A Magtrol hysteresis brake was used to load the motor under test. In all cases, an appropriately sized Lebow in-line rotating shaft torque sensor was connected between the motor and the load. Signals were processed through a Daytronic strain gauge conditioner and fed to a Compudas computer Also fed to the computer was information from the electronic precision watt transducers, RMS voltage transducers, RMS current transducers, frequency transducers and thermocouples. The computer continuously integrated the data from all of these sources and compiled it into coherent form for collection, processing, display and communication. Also part of the test system was a large variable transformer which allowed testing with balanced voltage or with any desired degree of imbalanced voltage.

All readings were taken after the motor was run in a loaded condition for 30 minutes. Sound pressure levels were obtained at a distance of one foot in a Ray Proof double wall sound room by a Quest Electronics Model 215 Sound Level Meter.

As shown in Table 2, with the motor in original manufacturers condition the effective turns of the two windings in the motor are not equal (start winding 79.8 turns and run winding 127.7). After remanufacture to quasi-double-resonant condition, the two windings have equal turns (each have 111.7). This modification allows the creation of a perfectly round revolving magnetic field. The quasi-double-resonant technology uses smaller diameter wire to increase the packing factor and allow for the manufacture of smaller motors and/or motors with smaller magnetic losses. As can be seen from the above figures, the wire utilized is less than half the size of the original wire.

Table 3 shows that the power factor stays near unity throughout the entire load range (97.27 at no-load to 99.9 at full-load). Because of the accuracy of the test equipment, it is easily seen that the total of the watt measurements for each component equals the amount of wattage taken from the power supply. The energy (watts) in the two windings is nearly equal, at both no-load and full-load, even though the voltage, current and power factor are not equal.

Finally, Table 1 shows that, after the conversion to quasi-double-resonant circuitry, the motor has less slip, higher efficiency, higher power factor, reduced temperature, lower sound level, reduced in-rush current and increased starting torque.

The claims appended hereto are meant to cover modifications disclosed and undisclosed which come within the scope of the claims.

What is claimed is:

1. An electromagnetic induction machine comprising:
   a rotatable, magnetically excitable rotor;
   a stationary stator operatively associated with said rotor;
   at least two windings electrically connected in series and each winding defining a pair of magnetic poles disposed proximate said rotor in said stator; and
   capacitor means in parallel combination with one of said windings and said combination in series with the other one of said windings, the size of the capacitor being such that a quasi-parallel resonant circuit is formed with said one winding and a quasi-series resonant circuit is formed with said other one of said windings.

2. An induction machine as claimed in claim 1, wherein said machine has at least one pair of power input terminals which are adapted to be coupled to an a.c. power source and the serially connected windings are coupled across said input terminals.

3. An induction machine as claimed in claim 2, wherein said rotor includes a plurality of longitudinally insulated conductors, said stator circumferentially surrounds said rotor and includes teeth radially extending towards said rotor, and said windings establish said magnetic poles via said teeth when excited, wherein a balanced rotating magnetic field is present due to the transfer of energy from the excited windings to said rotor, the return of energy from said rotor to said windings and the storage of the returned energy in said capacitor.

4. An electromagnetic induction machine as claimed in claim 1, wherein said rotor circumferentially surrounds said stationary stator.

5. An electromagnetic induction machine as claimed in claim 1, wherein said capacitor means comprises at least one alternating-current bipolar, non-electrolytic liquid-type capacitor.

6. An electromagnetic induction machine as claimed in claim 1, further comprising a second capacitor means arranged in series with a switch means, said arrangement being in parallel with said capacitor means, said switch means being normally closed, and opened when said rotor reaches a certain speed.

7. An electromagnetic induction machine as claimed in claim 6, wherein said second capacitor means being selected from the group consisting essentially of a.c. bipolar, non-electrolytic liquid-type capacitors and a.c. bipolar electrolytic-type capacitors.

8. An electromagnetic induction machine as claimed in claim 2, wherein said capacitor means in said two quasi-resonant circuits serve as a phase doubling capacitor by creating two balanced phases from said input power source.

9. An electromagnetic induction machine as claimed in claim 1, wherein the phase voltages generated for each of said two windings is approximately equal to the applied phase voltage divided by the square root of two.

10. An electromagnetic induction machine as claimed in claim 1, wherein said serially connected windings are wound with effective turns ranging from the same number of turns in each winding to a ratio of 1.05:1.

11. An electromagnetic induction machine as claimed in claim 1, wherein said serially connected windings substantially are wound with wire size ranging from the same size in each winding to a ratio of 1:2.

12. An electromagnetic induction machine as claimed in claim 11, wherein the serially connected windings, when wound with unequal wire sizes, having the quasi-series winding as the winding with the smaller circular mil area and the quasi-parallel winding as the winding with the larger circular mil area.

13. An electromagnetic induction machine as claimed in claim 1, further comprising an air gap between said teeth and said rotor, wherein said air gap includes a perfectly round revolving magnetic field.

14. An electromagnetic induction machine as claimed in claim 1, wherein due to the reduction of current in the windings, said machine is operative in the linear portion of the BH curve below saturation.

15. An electromagnetic induction machine as claimed in claim 1, wherein the quasi-resonant windings are placed relative to each other in the range between 60 and 130 electrical degrees.

16. An electromagnetic induction machine as claimed in claim 15, wherein the quasi-resonant windings are placed at substantially 90 electrical degrees relative to each other.

17. An inductive dynamoelectric machine comprising:
   a hollow, cylindrically shaped, longitudinally slotted stator;
   at least a pair of stator windings disposed in the slots around the interior of said stator, said stator windings being electrically serially connected together and connected across a power input of said dynamoelectric machine;
   a capacitor in parallel combination with one of said stator windings and said combination in series with the other said stator winding forming a quasi-double-resonant circuit that includes a quasi-series resonant circuit and a quasi-parallel resonant circuit;
   a longitudinally slotted, rotatable rotor disposed in the interior space defined by said stator; and
   a plurality of electrically coupled rotor windings disposed in the slots on the periphery of said rotor wherein said stator windings and said rotor windings are magnetically coupled together and a balanced rotating magnetic flux wave is produced due to the storage and delivery of energy by the capacitor, the stator windings and the rotor windings under substantially all load conditions.

18. An inductive dynamoelectric machine as claimed in claim 17, wherein the capacitance value of said capacitor is selected to produce said quasi-double-resonance circuit and wherein the Q factor of said quasi-double-resonance circuit is continually adjusted by the admittance of the rotor windings.

19. An electromagnetic induction machine as claimed in claim 17, wherein said capacitor means comprises at least one alternating-current bipolar, non-electrolytic liquid-type capacitor.

20. An electromagnetic induction machine as claimed in claim 17, further comprising second capacitor means arranged in series with a switch means, said arrangement being in parallel with said capacitor means, said switch means being normally closed, and opened when said rotor reaches a certain speed.

21. An electromagnetic induction machine as claimed in claim 20, wherein all second capacitor means being selected from the group consisting essentially of a.c. bipolar, non-electrolytic liquid-type and a.c. bipolar, electrolytic-type capacitor.

22. An electromagnetic induction machine as claimed in claim 17, wherein said capacitor means in said two quasi-resonant circuits serve as a phase doubling capacitor by creating two balanced phases from said input power source.

23. An electromagnetic induction machine as claimed in claim 17, wherein the phase voltages generated for each of said windings are approximately equal to the applied phase voltage divided by the square root of two.

24. An electromagnetic induction machine as claimed in claim 17, wherein said serially connected windings are wound with effective turns ranging from the same number of turns in each winding to a ratio of 1.05:1.

25. An electromagnetic induction machine as claimed in claim 17, wherein said serially connected windings substantially are wound with wire size ranging from the same size in each winding to a ratio of 1:2.

26. An electromagnetic induction machine as claimed in claim 17, wherein the serially connected windings, when wound with unequal wire size, have the quasi-series winding as the winding with the smaller circular mil area and the quasi-parallel winding as the winding with the largest circular mil area.

27. An electromagnetic induction machine as claimed in claim 17, further comprising an air gap between said teeth and said rotor, wherein said air gap includes a perfectly round revolving magnetic field.

28. An electromagnetic induction machine as claimed in claim 17, wherein due to the reduction of current in the windings, said machine is operative in the linear portion of the BH curve or well below saturation.

29. An electromagnetic induction machine as claimed in claim 17, wherein the quasi-resonant windings are placed relative to each other in the range between 60 and 130 electrical degrees.

30. An electromagnetic induction machine as claimed in claim 29, wherein the quasi-resonant windings are placed at substantially 90 electrical degrees relative to each other.

31. A polyphase inductive dynamoelectric machine adapted to be supplied with a polyphase power at a like number of power phase input terminals comprising:
   a rotatable rotor carrying a plurality of interconnected rotor windings;
   a stator circumferentially surrounding said rotor;
   a pair of serially connected stator windings for each phase of said polyphase power disposed in said stator, each pair receiving, via one of said power input terminals, a different phase of said polyphase power and adapted to be magnetically coupled to said rotor windings; and
   a respective capacitor for each pair of stator windings, said respective capacitor connected in series with a first winding of said pair and in parallel with a second winding thereof, the size of the capacitor being such that a respective quasi-series resonant circuit is formed with said first winding and a respective quasi-parallel resonant circuit is formed with said second winding.

32. A polyphase inductive dynamoelectric machine as claimed in claim 31, wherein all the pairs of stator windings are connected in a Δ configuration with respect to said input terminals.

33. A polyphase inductive dynamoelectric machine as claimed in claim 31, wherein all the pairs of stator windings are connected in a wye configuration with respect to said input terminals.

34. A method of generating torque form an a.c. power source including the steps of:
   forming a quasi-souble-resonant circuit comprising two stationary serially connected inductive elements and a capacitive element connected in parallel combination with one of said inductive elements and the combination connected in series with the other of said inductive elements to respectively form a quasi-parallel resonant circuit and a quasi-series resonant circuit;
   providing a rotatable inductive element adapted to deliver torque;
   applying said a.c. power across said two serially connected inductive elements;
   magnetically coupling said two serially connected inductive elements with said rotatable inductive element; and
   producing a balanced rotating magnetic flux wave by storing and by delivering stored energy from one of said quasi-serial resonant circuit or said quasi-parallel resonant circuit to the other one of said quasi-serial resonant circuit or said quasi-parallel resonant circuit upon a change in the magnetic flux linking said two inductive elements and said rotating inductive element.

35. A method of generating torque from an a.c. power source including the steps of:
   forming a quasi-double-resonant circuit comprising two stationary serially connected inductive elements and a capacitive element connected in series with one of said inductive elements and in parallel to the other of said inductive elements to respectively form a quasi-series resonant circuit and a quasi-parallel resonant circuit;
   providing a rotatable inductive element adapted to deliver torque;
   applying said a.c. power across said two serially connected inductive elements;
   magnetically coupling said two serially connected inductive elements with said rotatable inductive element; and
   producing a balanced rotating magnetic flux wave by storing and by delivering stored energy from one of said quasi-serial resonant circuit or said quasi-parallel resonant circuit to the other one of said quasi-serial resonant circuit or said quasi-parallel resonant circuit upon a change in the magnetic flux linking said two inductive elements and said rotating inductive element.

36. A polyphase inductive dynamoelectric machine adapted to be supplied with a polyphase power at a like number of power phase input terminals comprising:
- a rotatable rotor carrying a plurality of interconnected rotor windings;
- said rotor circumferentially surrounding a stationary stator;
- a pair of serially connected stator windings for each phase of said polyphase power disposed in said stator, each pair receiving, via one of said power input terminals, a different phase of said polyphase power and adapted to be magnetically coupled to said rotor windings; and
- a respective capacitor for each pair of stator windings, said respective capacitor connected in quasi-series with a first winding of said pair and in parallel with a second winding thereof, the size of the capacitor being such that a respective quasi-series resonant circuit is formed with said first winding and a respective quasi-parallel resonant circuit is formed with said second winding.

37. A polyphase inductive dynamoelectric machine as claimed in claim 36 wherein all the pairs of stator windings are connected in a Δ configuration with respect to said, input terminals.

38. A polyphase inductive dynamoelectric machine as claimed in claim 36, wherein all the pairs of stator windings are connected in a wye configuration with respect to said input terminals.

* * * * *